(12) United States Patent
Zhao et al.

(10) Patent No.: US 7,220,148 B2
(45) Date of Patent: May 22, 2007

(54) SIM CARD CONNECTOR WITH LOCKING ARRANGEMENT

(75) Inventors: Shan-Ji Zhao, Taipei (TW); Jin-Fei Li, Taipei (TW)

(73) Assignee: Advanced Connectek Inc., Taipei (TW)

( * ) Notice: Subject to any disclaimer, the term of this patent is extended or adjusted under 35 U.S.C. 154(b) by 0 days.

(21) Appl. No.: 11/440,463

(22) Filed: May 25, 2006

(65) Prior Publication Data

US 2007/0093137 A1    Apr. 26, 2007

(30) Foreign Application Priority Data

Oct. 21, 2005    (TW)    .............................. 94218276 U

(51) Int. Cl.
*H01R 24/00*    (2006.01)
(52) U.S. Cl. ...................................... 439/630
(58) Field of Classification Search ................. 439/630
See application file for complete search history.

(56) References Cited

U.S. PATENT DOCUMENTS 6,149,466 A * 11/2000 Bricaud et al. ............. 439/630

* cited by examiner

*Primary Examiner*—Javaid H. Nasri
(74) *Attorney, Agent, or Firm*—Troxell Law Office, PLLC

(57) ABSTRACT

A SIM card connector includes an insulative base including on its either side an L-shaped rear groove, a recess including a rear ramp, an intermediate protrusion, a tab between the rear ramp and the protrusion, and a front protuberance, and a front stop member; a cover including two side flanges each including a rear pin slidably fitted in and confined by the groove to form a pivot, rear and front gables, and an intermediate tongue; and conductors on a bottom of the base. Sliding the cover forward will interlock the cover and the base by moving either pin to a forward end of the groove with either rear fastening member being urged against the protuberance, either tongue being stopped by the protrusion, and either front fastening member being securely engaged with both the stop member and protuberance after passing the stop member.

3 Claims, 5 Drawing Sheets

SIM CARD CONNECTOR WITH LOCKING ARRANGEMENT

BACKGROUND OF THE INVENTION

1. Field of Invention

The present invention relates to SIM (Subscriber Identity Module) card connectors, and more particularly to such a SIM card connector having an improved locking arrangement.

2. Description of Related Art

Technology, particularly mobile communication technology, has known a rapid, spectacular development in recent years. For mobile phones, its trend is compact, aesthetic, and multi-functional. In this regard, components (e.g., SIM card connectors) for mobile phone are also required to improve.

A conventional SIM card connector in its open condition is shown in FIG. 1. The substantially rectangular SIM card connector comprises an insulative base 4, a cover 5, and a plurality of parallel conductors 41 on a bottom of the base 4. The base 4 comprises two opposite, cylindrical arms 42 on both sides proximate two rear corners, two opposite snap fastening members 43 on both sides proximate two front corners, the snap fastening member 43 including a cavity 44 and a tab 45, two front edge sections 40, and a rectangular recess 402 formed between the front edge sections 40.

The cover 5 comprises a body 50, two pivots 52 at two rear corners of the body 50, the pivot 52 including an elongate opening 521 snugly fitted around the arms 42 to form a hinge, two side flanges 51, and two opposite, mating snap fastening members 53 on both sides proximate two front corners, the mating snap fastening member 53 including a latch 531 and a hook 532.

A user may close the cover 5 onto the base 4 by pivoting the cover 5 about the pivots 52. As a result, the latches 531 are fitted in the cavities 44 and the hooks 532 are matingly engaged with the tabs 45.

But this locking design is unsatisfactory for the purpose for which the invention is concerned for the following reasons: An accidental back or forth movement of the cover 5 may unlock the SIM card connector because there is no stopping mechanism. Further, the locking engagement of the snap fastening members 43 and 53 is not reliable. In fact, it is relatively loose. Thus, the need for improvement still exists.

SUMMARY OF THE INVENTION

It is therefore one object of the present invention to provide a SIM card connector having a locking arrangement comprising a base including on its either side a recess extended from an intermediate portion to a front end, an intermediate protrusion, and a tab between a rear end of the recess and the protrusion; and a cover including on its either side rear and front inward gables and an intermediate tongue wherein the gables and the tongue on either side of the cover are adapted to secure to the corresponding protrusion and tab on either side of the base by sliding the cover forward in its closed, locked condition.

It is another object of the present invention to provide a SIM card connector having a locking arrangement wherein the base further comprises a rear stop member on either side such that either front gable is securely engaged with the stop member after passing the stop member in its closed, locked condition. Thus, even a strong vibration of the SIM card connector will not compromise the locking arrangement.

To achieve the above and other objects, the present invention provides a SIM card connector of substantially rectangular, comprising an insulative base including on its either side an L-shaped groove on a rear corner, a recess extended from an intermediate portion to a front end and including a rear ramp, an intermediate protrusion, a tab between the rear ramp and the protrusion, and a front protuberance, and a stop member extended from a rear end of the protuberance and disposed perpendicular to the protuberance; a cover including two side flanges each including a pin on a rear corner slidably fitted in and confined by the groove to form a pivot, rear and front openings, rear and front fastening members each being parallel with the adjacent opening, and an intermediate tongue; and a plurality of parallel conductors on a bottom of the base; whereby pivoting the cover about the pins to cover the base will cause either rear fastening member to urge against a portion of the recess between the rear ramp and the protuberance, either tongue to fit between the tab and the protrusion, and either front fastening member to urge against a portion of the recess between the protrusion and both the stop member and protuberance; and whereby sliding the cover forward will interlock the cover and the base by moving either pin forward from a bending point of the groove until being stopped by a forward end of the groove with either rear fastening member being urged against the protuberance, either tongue being stopped by the protrusion, and either front fastening member being securely engaged with both the stop member and protuberance after passing the stop member.

In one aspect of the present invention the fastening member is a gable.

The above and other objects, features and advantages of the present invention will become apparent from the following detailed description taken with the accompanying drawings.

DETAILED DESCRIPTION OF THE INVENTION

Figure 1:
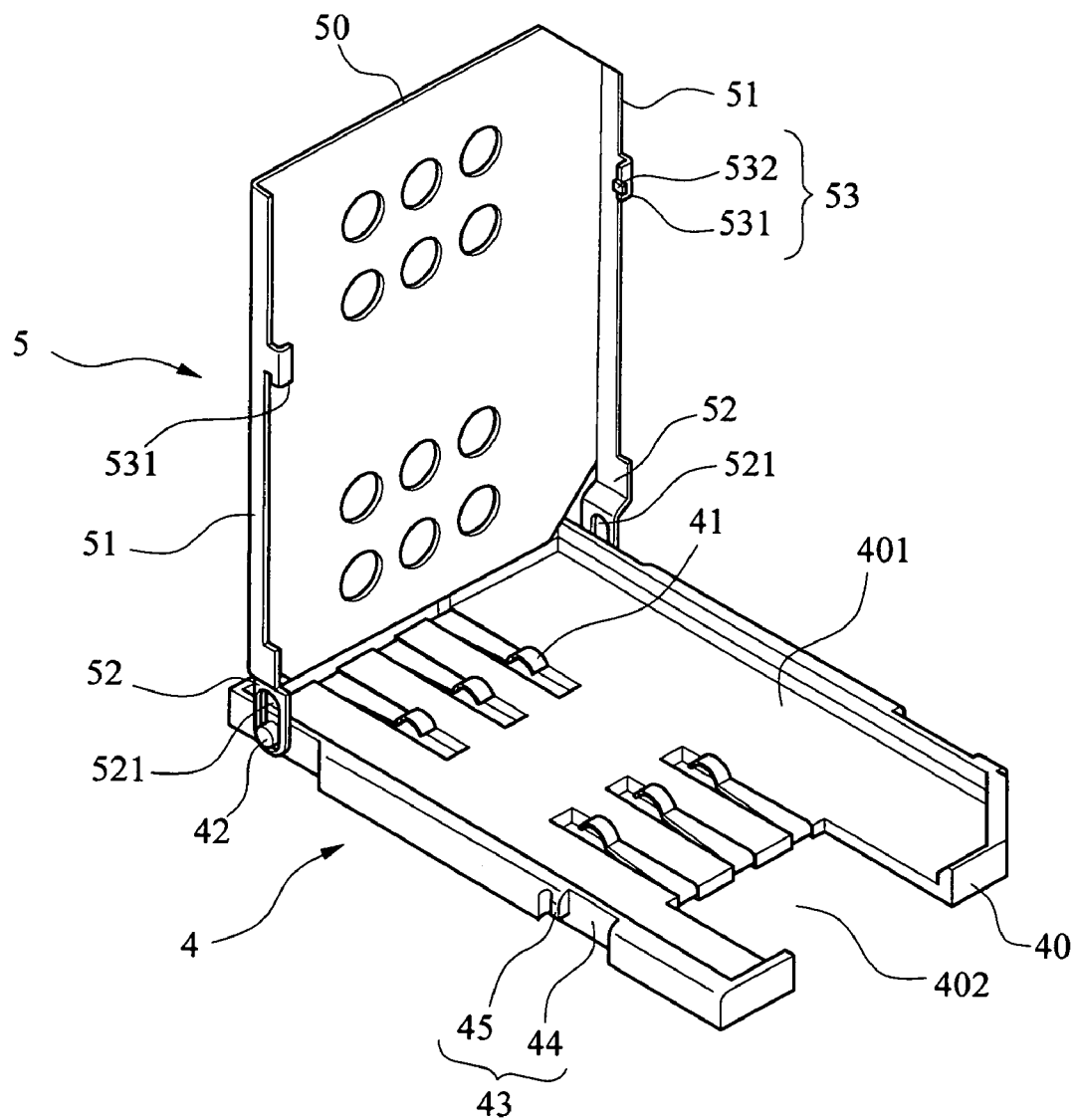
FIG. 1 is a perspective view of a conventional SIM card connector in its open condition.
Figure 2:
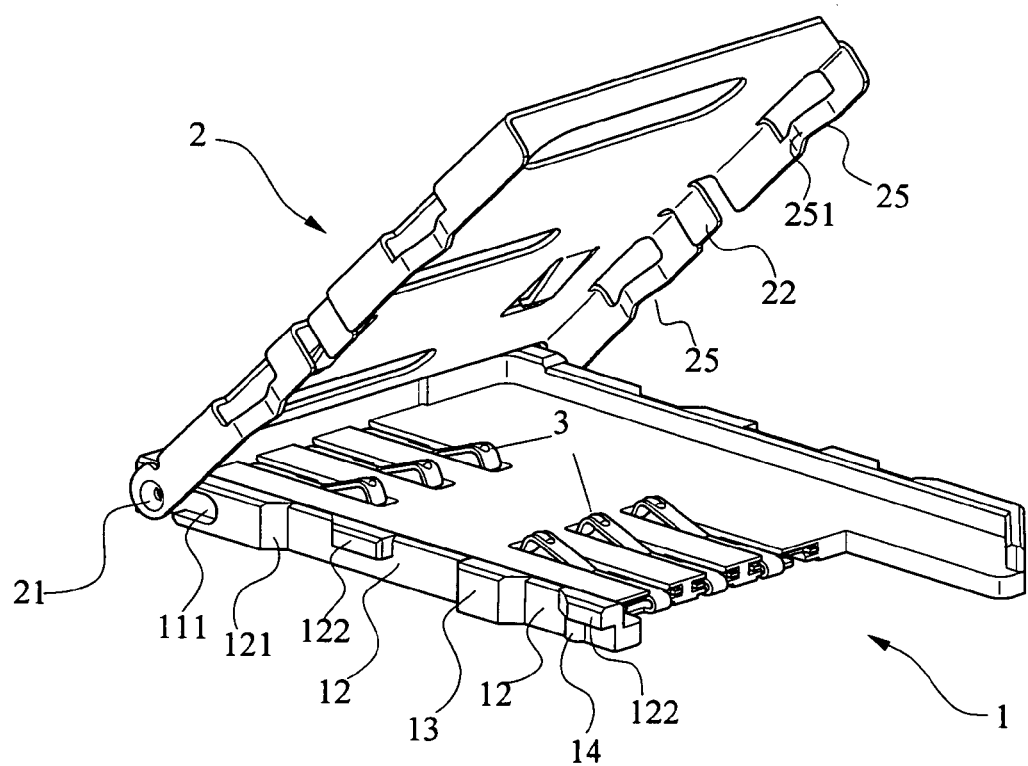
FIG. 2 is a perspective view of a preferred embodiment of SIM card connector according to the invention in its open condition.
Figure 3:
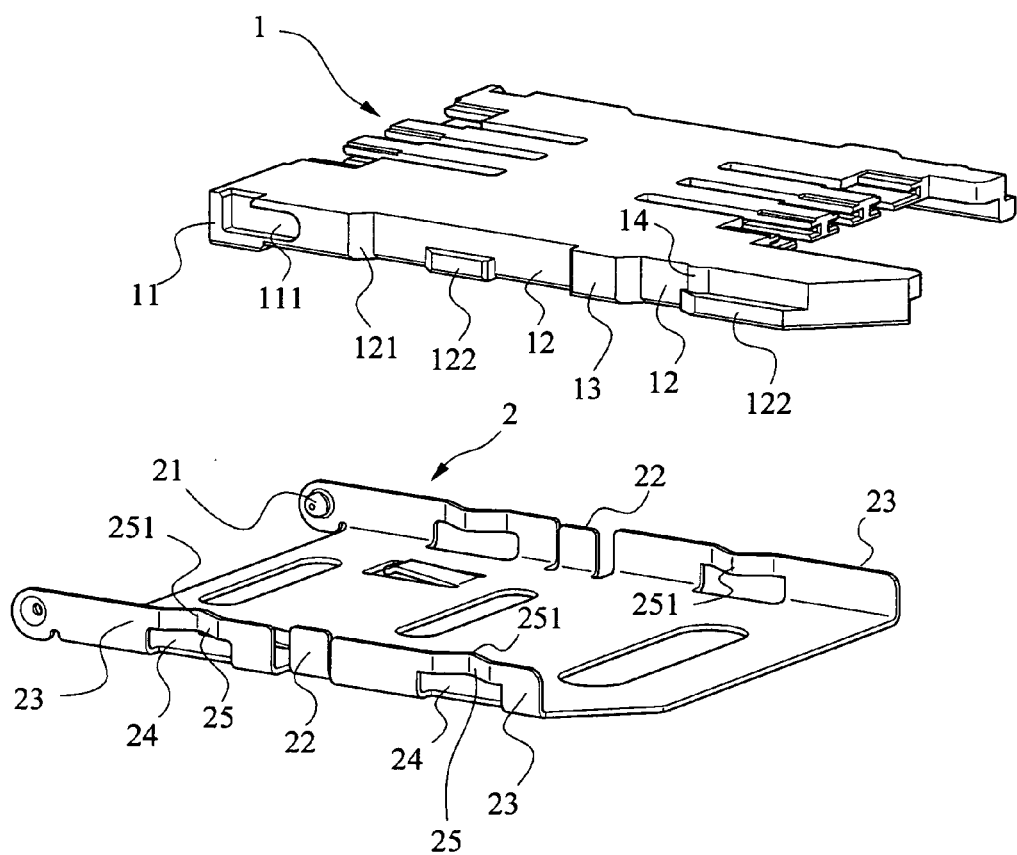
FIG. 3 is an exploded perspective view of the SIM card connector of FIG. 2.
Figure 4:
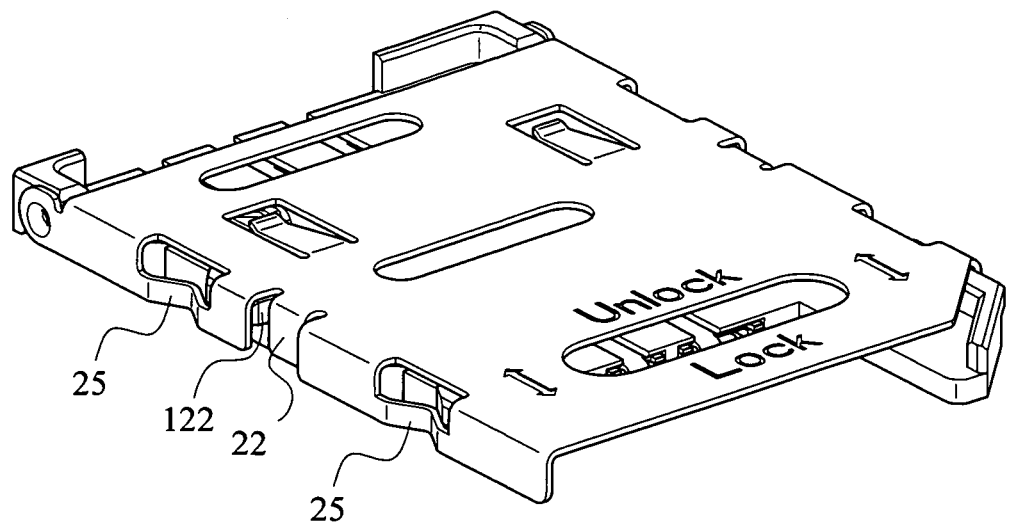
FIG. 4 is a perspective view of the SIM card connector of FIG. 2 in its closed, unlocked condition.
Figure 5:
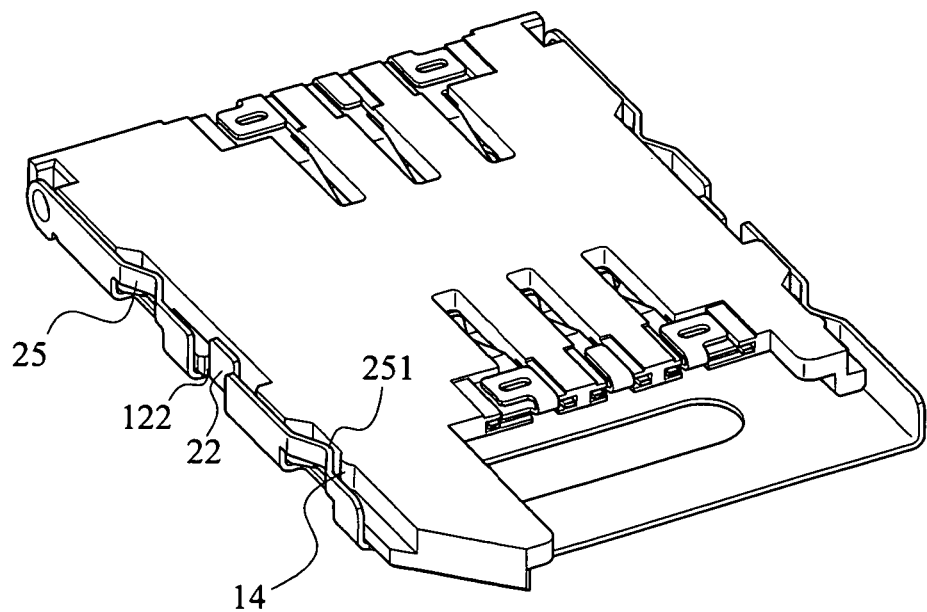
FIG. 5 is a view of the SIM card connector of FIG. 4 from an opposite perspective.
Figure 6:
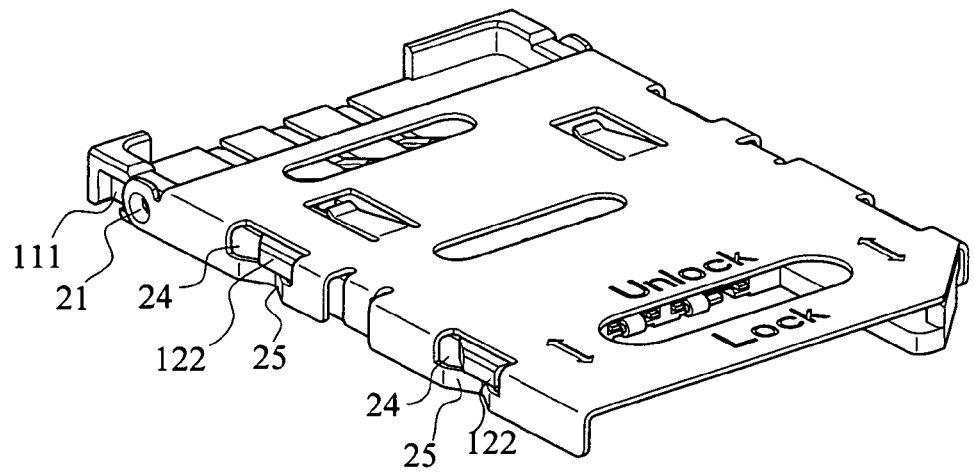
FIG. 6 is a perspective view of the SIM card connector of FIG. 2 in its closed, locked condition.
Figure 7:
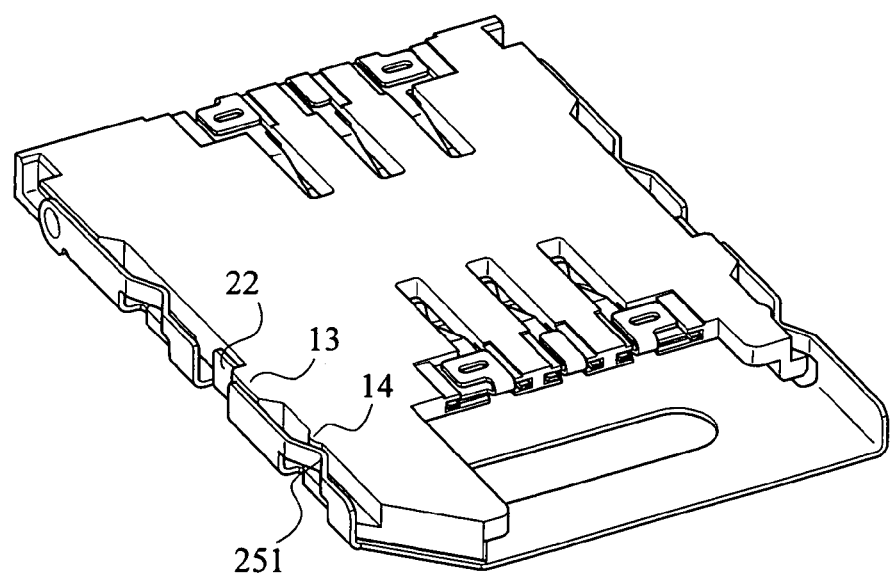
FIG. 7 is a view of the SIM card connector of FIG. 6 from an opposite perspective.

Referring to FIGS. 2 to 7, a SIM card connector in accordance with a preferred embodiment of the invention is shown. The substantially rectangular SIM card connector comprises an insulative base 1, a cover 2, and a plurality of parallel conductors 3 on a bottom of the base 1. Each component is discussed in detailed below.

The base 1 comprises a front cut terminated at the conductors 3. On either side of the base 1 there are provided an L-shaped projection 11 on a rear corner, the projection 11 including an abutted L-shaped groove 111, a recess 12 extended from an intermediate portion to a front end and including a rear ramp 121, an intermediate protrusion 13, a tab 122 between the rear ramp 121 and the protrusion 13, and a front protuberance 122, and a stop member 14 extended from a rear end of the protuberance 122 and disposed perpendicular to the protuberance 122.

The cover 2 is of inverted U-section and comprises a plurality of openings (not labeled) on its main portion. On either side 23 of the cover 2 there are provided a half-spherical pin 21 on a rear corner, rear and front openings 24, rear and front inward flexible gables 25 each being parallel with the adjacent opening 24, the gable 25 including an apex 251, and an intermediate tongue 22.

In an assembled state of the SIM card connector (see FIGS. 4 and 5), either pin 21 is slidably fitted in and confined by the groove 111, either rear gable 25 is urged against a portion of the recess 12 between the rear ramp 121 and the protuberance 122, either tongue 22 is fitted between the tab 122 and the protrusion 13, and either front gable 25 is urged against a portion of the recess 12 between the protrusion 13 and both the stop member 14 and protuberance 122. Further, the conductors 3 are fitted in respective openings on the main portion of the cover 2. This is also a closed, unlocked condition of the SIM card connector.

For locking the SIM card connector (see FIGS. 6 and 7), a user may slide the cover 2 forward to cause either pin 21 to move forward from a bending point of the groove 111 until being stopped by a forward end of the groove 111. In this closed, locked condition of the SIM card connector, either rear gable 25 is urged against the protuberance 122, either tongue 22 is urged against and stopped by the protrusion 13, and either front gable 25 is securely engaged with both the stop member 14 and protuberance 122 after passing the stop member 14.

It is understood that the only way to open the locked SIM card connector is to slide the cover 2 rearward until being stopped by the bending point of the groove 111 and then pivot the cover 2 (or the base 1) about the pins 21. Thus, the invention can prevent the SIM card connector from being unlocked and opened by an accidental movement of the cover 2.

While the invention herein disclosed has been described by means of specific embodiments, numerous modifications and variations could be made thereto by those skilled in the art without departing from the scope and spirit of the invention set forth in the claims.

What is claimed is:

1. A SIM (Subscriber Identity Module) card connector of substantially rectangular, comprising:

an insulative base 1 on an either side thereof including an L-shaped groove 111 on a rear corner, a recess 12 extended from an intermediate portion to a front end and having a rear shoulder 121, an intermediate protrusion 13, a tab 122 between the rear shoulder 121 and the protrusion 13, and a front protuberance 122, and a stop member 14 extended from a rear end of the protuberance 122 and disposed perpendicular to the protuberance 122;

a cover 2 including two side flanges 23 each including a pin 21 on a rear corner slidably fitted in and confined by the groove 111 to form a pivot, a rear and a front openings 24, a rear and a front flexible fastening members 25 each being parallel with the adjacent opening 24, and an intermediate tongue 22; and a plurality of parallel conductors 3 on a bottom of the base 1;

whereby pivoting the cover 2 about the pins 21 to cover the base 1 will cause either rear fastening member 25 to urge against a portion of the recess 12 between the rear shoulder 121 and the protuberance 122, either tongue 22 to fit between the tab 122 and the protrusion 13, and either front fastening member 25 to urge against a portion of the recess 12 between the protrusion 13 and both the stop member 14 and protuberance 122; and whereby sliding the cover 2 forward will interlock the cover 2 and the base 1 by moving either pin 21 forward from a bending point of the groove 111 until being stopped by a forward end of the groove 111 with either rear fastening member 25 being urged against the protuberance 122, either tongue 22 being stopped by the protrusion 13, and either front fastening member 25 being securely engaged with both the stop member 14 and protuberance 122 after passing the stop member 14.

2. The SIM card connector of claim 1, wherein the fastening member 25 is a gable.

3. The SIM card connector of claim 1, wherein the shoulder 121 is a ramp.

* * * * *